US010171933B2

(12) United States Patent
Allen et al.

(10) Patent No.: US 10,171,933 B2
(45) Date of Patent: *Jan. 1, 2019

(54) ISSUING NOTIFICATIONS ABOUT LOST DEVICES (71) Applicant: International Business Machines Corporation, Armonk, NY (US)

(72) Inventors: Ira L. Allen, Dallas, TX (US); Gregory J. Boss, Saginaw, MI (US); Andrew R. Jones, Round Rock, TX (US); Kevin C. McConnell, Austin, TX (US); John E. Moore, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,827

(22) Filed: Aug. 2, 2017

(65) Prior Publication Data

US 2017/0332195 A1 Nov. 16, 2017

Related U.S. Application Data (63) Continuation of application No. 14/924,849, filed on Oct. 28, 2015, now Pat. No. 9,860,689.

(51) Int. Cl.
*H04W 4/02* (2018.01)
*G08B 21/24* (2006.01)

(52) U.S. Cl.
CPC .............. *H04W 4/02* (2013.01); *G08B 21/24* (2013.01)

(58) Field of Classification Search
CPC ................................. H04W 4/02; G08B 21/24

USPC ....................................................... 340/539.32
See application file for complete search history.

(56) References Cited

U.S. PATENT DOCUMENTS

| 8,773,275 | B1 | 7/2014 | Parenteau et al. |
| 8,810,392 | B1 | 8/2014 | Teller et al. |
| 8,832,251 | B2 | 9/2014 | George |
| 8,836,510 | B2 * | 9/2014 | Brown .................. H04W 4/029 340/571 |
| 8,929,874 | B2 | 1/2015 | Mahaffey et al. |
| 9,582,984 | B2 | 2/2017 | Crepeau et al. |
| 9,860,689 | B2 * | 1/2018 | Allen ..................... G08B 21/24 |
| 2010/0184378 | A1 | 7/2010 | Wakefield |

(Continued)

FOREIGN PATENT DOCUMENTS

WO 2009050679 A1 4/2009

OTHER PUBLICATIONS

Tapellini, Donna; "Smart phone thefts rose to 3.1 million in 2013"; Consumer Reports; May 28, 2014; Printed on: Jun. 23, 2015; pp. 1-6; <http://www.consumerreports.org/cro/news/2014/04/smart-phone-thefts-rose-to-3-1-million-last-year/index.htm>.

(Continued)

*Primary Examiner* — Kerri L McNally
(74) *Attorney, Agent, or Firm* — Edward J. Wixted, III (57) ABSTRACT

In an approach for notifying a user of a location of a device, a processor receives a first location of a first device. A processor determines that the first device has been separated from a user of the first device. A processor determines a second device located at, within a first predetermined threshold, the first location. A processor sends a first notification to the second device, wherein the notification includes, at least, that the first device is located nearby.

15 Claims, 4 Drawing Sheets

(56) References Cited

U.S. PATENT DOCUMENTS

| | | |
|---|---|---|
| 2014/0074921 A1 | 3/2014 | Poomachandran et al. |
| 2014/0213301 A1 | 7/2014 | Evans et al. |
| 2014/0357230 A1 | 12/2014 | Anson |
| 2016/0335876 A1* | 11/2016 | Verma .................... G01S 11/06 |
| 2016/0360376 A1 | 12/2016 | Bostick |
| 2017/0127226 A1 | 5/2017 | Allen et al. |

OTHER PUBLICATIONS

"Why MyDaigo?"; MyDaigo; Printed on: Jun. 24, 2015; pp. 1-4; <http://www.mydaigo.com/pages/why-mydaigo>.

"#1 Worldwide Airport Lost Property Database"; Airport Lost and Found; Printed on: Jun. 24, 2015; pp. 1-6; <http://www.airportlostandfound.com/>.

Allen et al., "Issuing Notifications About Lost Devices", U.S. Appl. No. 14/924,849, filed Oct. 28, 2015, 32 pages.

IBM, List of Patents Treated as Related, Appendix P, Filed Aug. 2, 2017, 2 pages.

* cited by examiner

ISSUING NOTIFICATIONS ABOUT LOST DEVICES

BACKGROUND OF THE INVENTION

The present invention relates generally to the field of device management and more particularly to issuing an alert about a lost or misplaced device.

Millions of mobile devices, smartphones and tablet computers are lost every year. While some of these devices are recovered by various means such as device tracking, many are not. The loss of so many devices on a yearly basis results in a significant cost to both consumers and insurance companies. In only the seven largest airports in the world, travelers lost a total of over 10,000 laptop computers between June 2012 and June 2013. In the year 2013, the number of lost or stolen smartphones in the United States reached 4.5 million devices.

SUMMARY

Aspects of an embodiment of the present invention disclose an approach for notifying a user of a location of a device. A processor receives a first location of a first device. A processor determines that the first device has been separated from a user of the first device. A processor determines a second device located at, within a first predetermined threshold, the first location. A processor sends a first notification to the second device, wherein the notification includes, at least, that the first device is located nearby.

DETAILED DESCRIPTION

In general, embodiments of the present invention provide a method, computer program product, and computer system for identifying that a device has been lost by a user and causing an alert to be sent regarding the identified lost device.

Figure 1:
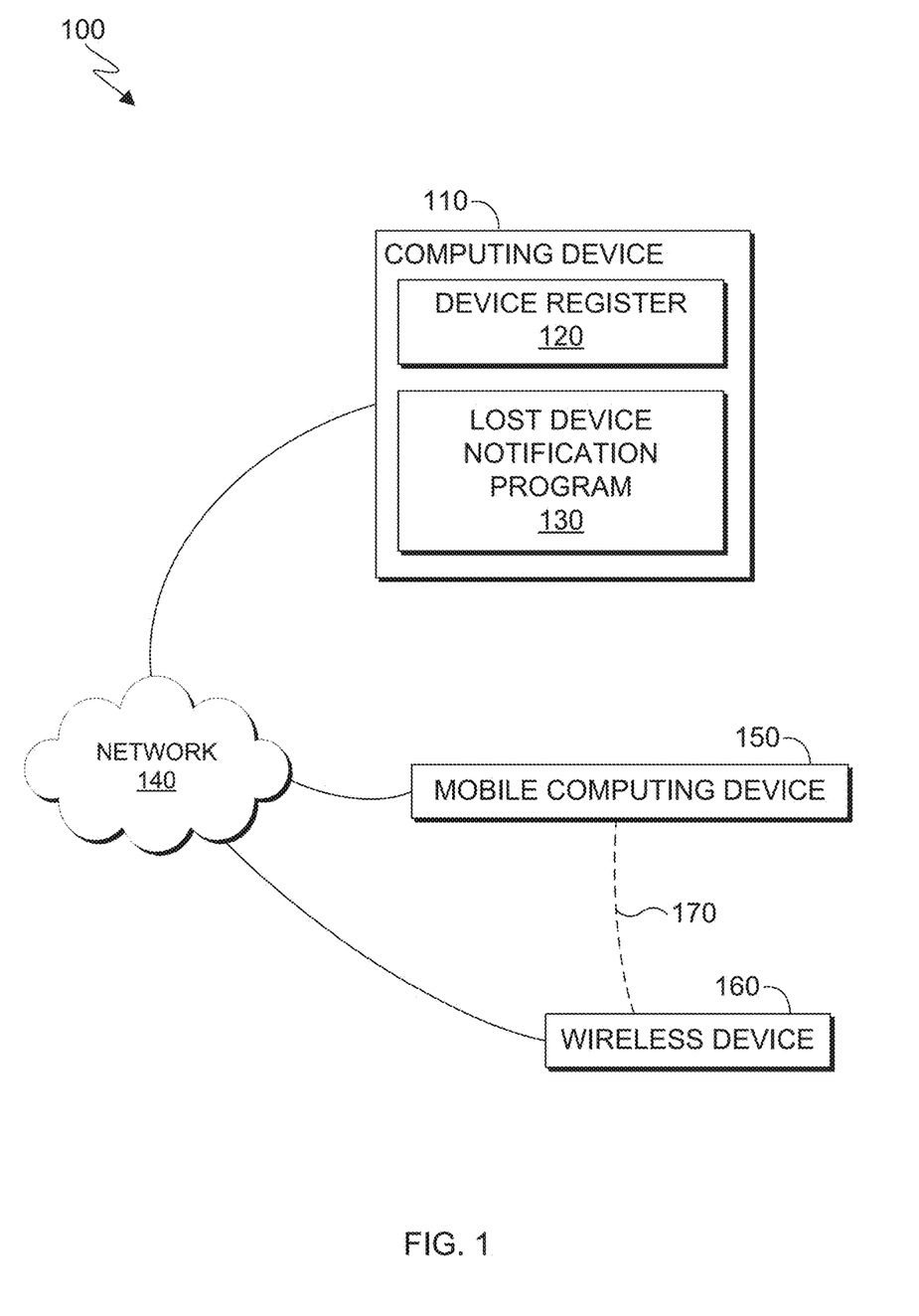
FIG. 1 is a functional block diagram illustrating a mobile computing environment including a computing device, a mobile computing device, and a wireless device, in accordance with an embodiment of the invention.

The present invention will now be described in detail with reference to the Figures. FIG. 1 is a functional block diagram illustrating a mobile computing environment, generally designated 100, in accordance with one embodiment of the present invention. In the depicted embodiment, environment 100 includes computing device 110, network 140, mobile computing device 150, and wireless device 160. Further, in the depicted embodiment, computing device 110 includes device register 120 and lost device notification program 130. Mobile computing device 150 and wireless device 160 are connected via wireless connection 170.

In various embodiments of the present invention, computing device 110 can be a server, laptop computer, tablet computer, netbook computer, personal computer (PC), or desktop computer. In another embodiment, computing device 110 represents a computing system utilizing clustered computers and components to act as a single pool of seamless resources. In general, computing device 110 can be any computing device or a combination of devices with access to lost device notification program 130 and network 140 and is capable of processing program instructions and executing lost device notification program 130, in accordance with an embodiment of the present invention. Computing device 110 may include internal and external hardware components, as depicted and described in further detail with respect to FIG. 4.

Device register 120 is a collection of data such as a database which lists all of the devices which are known by lost device notification program 130. In one embodiment, information related to a device is entered into device register 120 upon the user registering for a service such as a device loss notification service. In various embodiments, device register 120 includes information related to both devices which are being monitored by lost device notification program 130 as well as devices that can be utilized by lost device notification program 130 to display a notification of a lost or missing device.

Lost device notification program 130 is a computer program which receives a notification that a mobile computing device such as a laptop computer, tablet computer, or smartphone has been lost or misplaced and issues one or more notifications to nearby devices which can be used to help the owner of the device locate their lost device. In various embodiments, lost device notification program 130 can use any known method of identifying that a device has been misplaced or lost. For example, in one embodiment, lost device notification program 130 identifies that mobile computing device 150 has been lost when a wireless connection such as wireless connection 170 between mobile computing device 150 and wireless device 160 is broken. In this example, wireless device 160 is a smartphone which is located with the user of mobile computing device 150, and can be used to identify situations where mobile computing device 150 becomes physically separated from the owner of the device. In some embodiments, wireless device 150 is a wearable electronic device that is physically attached to the user. It should be noted that in various embodiments of the present invention, mobile computing device 150 and wireless device 160 may be interchangeable, as described herein. Further, the terms user and owner may be interchangeable, as described herein. For example, if wireless connection 170 is broken or severed, either, or both, of mobile computing device 150 and wireless device 160 may be identified as having been lost. In one embodiment, lost device notification program 130 causes a prompt to be displayed on both mobile computing device 150 and wireless device 160 such that the device currently with the user may be determined.

Upon receiving an indication that a device has been lost or misplaced, lost device notification program 130 sends one or more notifications to display devices which are located within close physical proximity to the last known location of the lost device or locations where the user may be going. In some embodiments, lost device notification program 130 uses information such as the calendar, email inbox, messages, or task list of the owner of a lost device to predict where the owner of the lost device may be going in the near future. The functionality of lost device notification program 130 is depicted and described in greater detail with respect to FIG. 2.

In the depicted embodiment, lost device notification program 130 is located on computing device 110. However, in other embodiments, lost device notification program 130 may be located externally and accessed through a communication network such as network 140. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 110, lost device notification program 130, mobile computing device 150, and wireless device 160, in accordance with a desired embodiment of the invention.

In various embodiments of the present invention, mobile computing device 150 can be a laptop computer, tablet computer, or netbook computer. In another embodiment, mobile computing device 150 is a device such as a smartphone, a smart watch, a wearable computing device, or a PDA. In general, mobile computing device 150 can be any computing device or a combination of devices with access to network 140 that is capable of wirelessly communicating with wireless device 160, in accordance with an embodiment of the present invention. Mobile computing device 150 may include internal and external hardware components, as depicted and described in further detail with respect to FIG. 4.

In one embodiment, wireless device 160 is a smartwatch, etc. In various embodiments of the invention, wireless device 160 is any computing device which is capable of communicating with network 140 and communicating with mobile computing device 150 via a wireless communication technology. The wireless communication technology through which wireless device 160 communicates with mobile computing device 150 can be a wireless communication technology such as Bluetooth®, Wi-Fi®, or any other wireless communication technology which facilitates wireless communication between two or more computing devices.

Wireless connection 170 is a wireless connection which allows for information to be wirelessly transmitted between mobile computing device 150 and wireless device 160. In various embodiments, wireless connection 170 can be a Wi-Fi® connection, a Bluetooth® connection, or any other wireless communication technology capable of transferring digital information between two computing devices.

Figure 2:
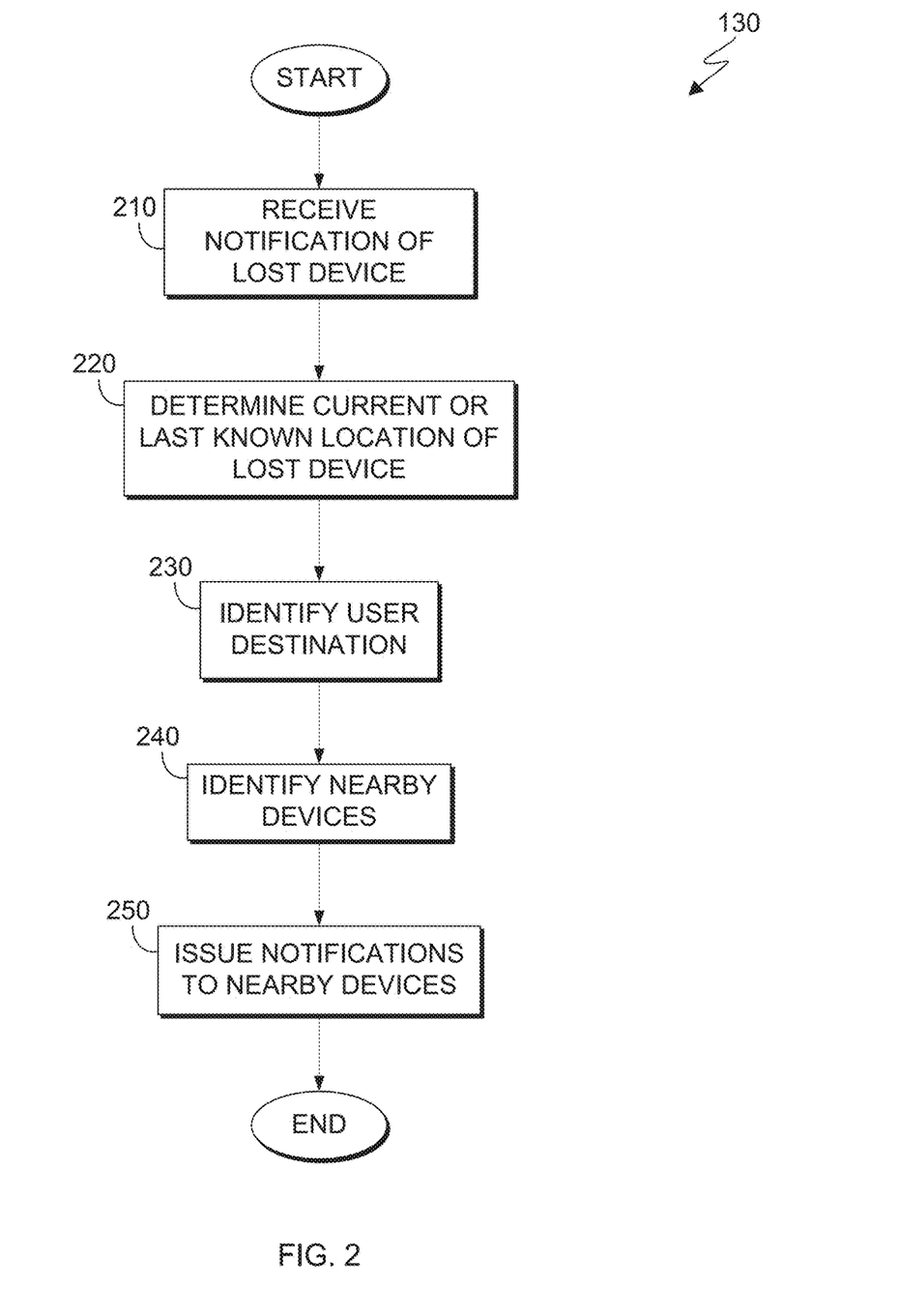
FIG. 2 is a flowchart depicting the operational steps included in a lost device notification program included in the computing device of FIG. 1, for issuing a notification that a device has been misplaced or lost, in accordance with an embodiment of the invention.

FIG. 2 is a flowchart depicting the operational steps included in lost device notification program 130 for issuing a notification about a lost computing device to nearby devices.

In step 210 lost device notification program 130 receives a notification that a device included within device register 120 has been lost. Any known process of determining that a device has been lost may be used in various embodiments of the invention. In some embodiments, a client program (not shown) is installed on one, or both, of mobile computing device 150 and wireless device 160. In such an embodiment, mobile computing device 150 and wireless device 160 may periodically contact one another via, for example, near field communication (NFC), Bluetooth®, Wi-Fi®, physical connection, or another method of contact. If mobile computing device 150 and/or wireless device 160 are unable to make contact, the client program (not shown) may determine that at least one of mobile computing device 150 and wireless device 160 is lost.

In another embodiment, mobile computing device 150 and wireless device 160 may maintain a wireless connection, such as wireless connection 170. Upon wireless connection 170 breaking, the client program (not shown) may determine that at least one of mobile computing device 150 and wireless device 160 is lost. In such an embodiment, the client program may allow for a user to provide input that causes wireless connection 170 to break, without triggering a lost determination, such that the user can elect to separate the devices.

In still another embodiment, mobile computing device 150 and wireless device 160 may each include global positioning system (GPS) capabilities and may be capable of maintaining a connection with a wireless network. In such an embodiment, mobile computing device 150 and wireless device 160 may each, periodically, provide GPS coordinates to lost device notification program 130. Responsive to the received GPS coordinates specifying that mobile computing device 150 and wireless device 160 are at different locations (and thus, the locations of mobile computing device 150 and wireless device 160 do not match), based on a predetermined threshold, lost device notification program 130 may determine that at least one of mobile computing device 150 and wireless device 160 is lost. Such a predetermined threshold may include, for example, a predetermined distance within which mobile computing device 150 and wireless device 160 are within to not be identified as lost.

In one embodiment, mobile computing device 150 periodically sends location signals to lost device notification program 130 via network 140. Such location signals may be based on, for example, GPS coordinates, mulilateration, Wi-Fi® connections, etc. In such an embodiment, lost device notification program 130 may receive a notification of the lost device from input by a user at wireless device 160. In such an embodiment, alternatively, when mobile computing device 150 stops sending location signals to lost device notification program 130, lost device notification program 130 may determine that mobile computing device 150 is lost. Such a scenario may arise if, for example, the battery of mobile computing device 150 loses charge.

In step 220 lost device notification program 130 determines the current or last known location of mobile computing device 150. In general, it is preferable to know the current location of the device, but this may not be possible in some instances such as embodiments where mobile computing device 150 does not have access to network 140, or if the battery of mobile computing device 150 has lost charge. In various embodiments, the current or last known location of the device is used to inform the owner of the device where they can go in order to retrieve their lost device. In some embodiments, mobile computing device 150 sends a signal to lost device notification program 130 indicating the location of mobile computing device 150 via network 140 using previously described location identification processes.

In step 230 lost device notification program 130 identifies or predicts the destination or projected location of the owner of the lost device (e.g., mobile computing device 150). In one embodiment, lost device notification program 130 examines the calendar, email inbox, messages, call history, task list, or any other data belonging to the owner of the lost device. For example, in one embodiment, the owner of a lost device sends a message immediately before losing their device which says "I will call you right after I get a coffee from Starbucks." In this embodiment, lost device notification program 130 determines that the immediate destination of the owner of the device is the nearest Starbucks coffee shop. In some embodiments, lost device notification program 130 may access structured data to identify or predict the destination of the owner of the lost device (e.g., mobile computing device 150). In some embodiments, lost device notification program 130 may utilize natural language processing and at least one set of dictionaries and rules to perform text analytics on examined text of the lost device or another device associated with the owner of the lost device to determine potential destination information of the owner. Text analytics can be performed using an Unstructured Information Management Architecture (UIMA) application configured to analyze unstructured information to discover knowledge that is relevant to a destination of a device owner by processing plain text and identifying entities, such as persons, places, organizations; or relations, such as located-at or going to. In one embodiment, lost device notification program 130 utilizes GPS, or other location identification methods, of wireless device 160 to determine the location of the user.

In some embodiments, lost device notification program 130 may determine a projected location of the owner based upon a variety of factors. For example, lost device notification program 130 may consider the average speed of a person, a tracked speed of the user (e.g., based on previously recorded GPS, or other location tracking, data), an amount of time that has elapsed since receiving the notification that mobile computing device 150 is lost, geographic information system (GIS) data associated with the last known location of mobile computing device 150, an identified destination of the user, or other factors.

In step 240 lost device notification program 130 identifies additional devices nearby mobile computing device 150 or a predicted location of the user, via network 140, which can receive a notification about mobile computing device 150. In some embodiments, a predetermined threshold may indicate whether such a device is at or near mobile computing device 150, or a predicted location of the user. For example, such a threshold may indicate a distance away from mobile computing device 150 or the predicted location of the user, and if the distance is greater than the specified threshold distance, the device is not considered to be at or near the location of mobile computing device 150 or the predicted location of the user. In some embodiments, nearby devices are devices located near the current or last known location of mobile computing device 150. In other embodiments, nearby devices are devices located near the location which is determined by lost device notification program 130 to be the destination of the owner of mobile computing device 150 or the current location of the owner of mobile computing device 150. The process of identifying nearby devices is depicted and described in greater detail with respect to FIG. 3. The additional devices nearby mobile computing device 150 may be identified based on a comparison between the determined current or last known location of mobile computing device 150 (see step 220) and locations of other devices located within a device register, for example, device register 120.

In step 250 lost device notification program 130 issues one or more notifications of the lost device (e.g., mobile computing device 150) to other display devices which are determined to be nearby (see step 240).

In one embodiment of the invention, a notification includes the name and contact information of the owner of the lost device (e.g., mobile computing device 150), as well as an indication that the owner has lost one of their devices (e.g., mobile computing device 150). One example of a notification is "John Smith, you have left your tablet computer at gate 310." In this embodiment, information such as the name of the owner and the type of device lost is retrieved from device register 120.

In another embodiment, where it is desired to make device theft more difficult, lost device notification program 130 issues a notification which does not explicitly name the location of the lost device (e.g., mobile computing device 150), but includes a description of where the device can be found which is only useful to the owner of the device. One example of this type of notification is "John Smith, you have left your tablet computer at the gate which your last flight arrived at." While this information facilitates the owner of the device (John Smith) determining that his tablet computer was left at gate 310, another person who intends to steal the lost device (e.g., mobile computing device 150) would not be able to determine the location of the device.

Display devices can include television screens, computer monitors, projectors, or any other device which is capable of displaying information, in accordance with an embodiment of the invention. In the embodiment depicted in FIG. 3 (an airport terminal), display devices may include television screens, displays which are used to display current flight information to airline passengers, terminals used by airline employees, and public address (PA) systems.

In some embodiments, the notifications described in step 250 are directed at the owner of mobile computing device 150, and thus, may be directed at an additional computing device, such as wireless device 160, known to be with the owner of mobile computing device 150, or, the notifications may be directed to a display device located at a predicted destination of the owner of mobile computing device, as described with regard to step 230. In other embodiments, the notifications described in step 250 are directed to an employee, security personal, or other individual who may be able to aid in the reunion of mobile computing device 150 and the respective owner. For example, an airport employee, in response to receiving such a notification, may be able to cause an announcement to be made on the PA system, or cause display devices throughout the airport to include a message to the owner of mobile computing device 150.

In one embodiment, lost device notification program 130 prioritizes which devices should receive notifications when multiple devices exist that are available to receive a notification. In some embodiments, lost device notification program 130 utilizes previously receive historical data indicating usage patterns of the user to determine which device should receive a notification. For example, a particular device owned by the user may be frequently used on the weekends, and if mobile computing device 150 is lost on a Saturday, a notification may be sent to the particular device that the owner frequently uses on the weekend. In some embodiments, each of the devices is registered with lost device notification program 130, and lost device notification program 130 is able to determine other devices that were with the owner around the time when mobile computer device 150 was determined to be lost. In such an embodiment, lost device notification program 130 may send a notification to one or more of the other devices that were with the owner. In some embodiments, if a response is not received from the owner after a period of time, a notification is sent to another device.

In one embodiment, a building, for example, an airport, may include a series of video cameras and a function of lost device notification program 130 may be capable of utilizing facial recognition techniques to identify the owner of mobile computing device 150, as well as a location the owner is looking at via tracking the owner's eyes. In such an embodiment, lost device notification program 130 may utilize any type of facial recognition and eye tracking technologies known in the art. In such an embodiment, upon identifying the owner of mobile computing device 150 and the location the owner is looking at, lost device notification program 130 may be able to identify at least one surface that the owner is looking at. In some embodiments, such a surface may be a display device registered with lost device notification program 130, and lost device notification program 130 may cause the display device to display a notification that mobile computing device 150 is lost, as described with reference to step 250. In another embodiment, a building or other location may be equipped with a series of projectors or lasers capable of projecting text on a surface. In such an embodiment, lost device notification program 130 may cause at least one of the projectors/lasers to project a message on the surface that the owner is looking at. In some embodiments, such projectors or lasers may be mounted throughout a building, for example, an airport terminal, and may be mounted with motors that allow each projector or laser to adjust the direction at which the projector or laser is pointing, allowing messages to be projected on a variety of surfaces within the building. In some embodiments, lost device notification program 130 may continue to project messages to the owner, on a variety of surfaces, until the owner has retrieved the lost device (e.g., mobile computing device 150).

Figure 3:
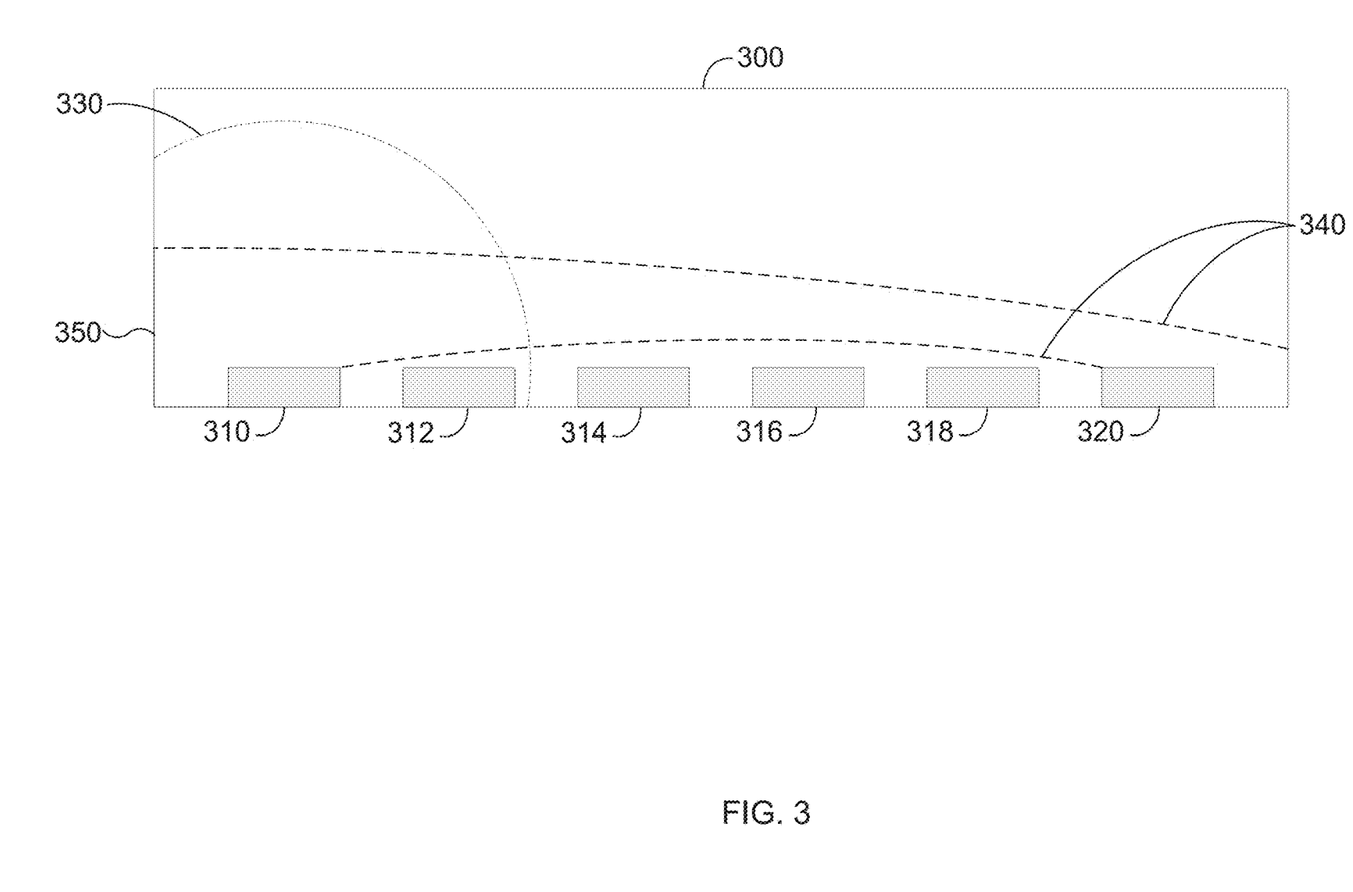
FIG. 3 is a diagram which illustrates the layout of an airport terminal, and the process of determining an area within the airport terminal in which an alert is to be displayed, in accordance with an embodiment of the invention.

FIG. 3 is a diagram of an airport terminal, generally designated 300, which includes gates 310-320, in accordance with an embodiment of the invention. FIG. 3 depicts an example of the steps lost device notification program 130 may take to identify nearby devices and/or issue notifications to nearby devices, as described with respect to steps 240 and 250 in FIG. 2. FIG. 3 further describes steps an embodiment of lost device notification program 130 may take to identify a destination of the user and identify nearby devices, as previously described with regard to FIG. 2.

In general, each gate 310-320 is a location within terminal 300 at which customers can board or exit a commercial flight. In one embodiment, as depicted in FIG. 3, a passenger transfers from a flight which arrived at gate 310 to a flight which departs from gate 320. In general, the process of transferring a flight involves a passenger walking from the gate from which they arrived to the gate from which they are to depart. In the embodiment depicted in FIG. 3, the passenger transferring flights involves the passenger walking from gate 310 to gate 320.

In the embodiment depicted in FIG. 3, it is known that the owner of the lost device (e.g., mobile computing device 150) is currently transferring from a flight which arrived at gate 310 to a flight which leaves from gate 320. Additionally, it is known that the owner of the device (e.g., mobile computing device 150) separated from the lost device four minutes ago, and gate 320 is a ten minute walk (0.6 miles) away from gate 310. Additionally, the current location of the lost device is determined to be at gate 310, which is also determined to be the location at which the device was lost. Such a determination could be made by lost device notification program 130 similarly to as described with respect to step 220 of FIG. 2.

Distance boundary 330 is a boundary which represent the maximum expected distance which the owner of the lost device (e.g., mobile computing device 150) would have travelled in the amount of time which has elapsed since the device was lost. In the embodiment depicted in FIG. 3, distance boundary 330 represents a distance of 0.25 miles, or roughly the distance that an average person can walk in four minutes time (at an estimated travel speed of 4 mph). It should be appreciated that the distance at which distance boundary 330 is drawn will depend on the specific situation surrounding each embodiment of the invention, and generally is determined by the amount of time which has elapsed since a device was lost.

Location boundary 340 is a boundary which is represents the expected to be path taken between the location at which the device (e.g., mobile computing device 150) was lost and the location determined to be the destination of the owner of the device. In the embodiment depicted in FIG. 3, location boundary 340 bounds the path between gate 310 and gate 320. In some embodiments, lost device notification program 130 may have access to, for example, floorplans or other GIS data associated with a location. Such GIS information may enable lost device notification program 130 to better determine a path the user is expected to take (e.g., by indicating walls and barriers) and thus, create location boundaries such as location boundary 340.

In one embodiment, the process of determining that the destination of the owner of the device is gate 320 involves lost device notification program 130 examining information, such as the email inbox of the owner of the device (e.g., mobile computing device 150). In this embodiment, an email message containing itinerary for a flight leaving from gate 320 is analyzed and used, possibly in conjunction with current flight schedule information, by lost device notification program 130 to determine that the owner of the device is currently transferring from gate 310 to gate 320. In another embodiment, the process of determining that the destination of the owner of the device is gate 320 involves examining a text message sent by the owner of the device that reads "I'm walking to gate 320 now, meet you there." It should be appreciated that embodiments of the invention are not limited to any particular method of determining the destination of the owner of the device. Additionally, the examples provided are meant to be illustrative, and are not intended to be limiting.

Probable location region 350 is the intersection of the region bounded by distance boundary 330 and location boundary 340 and may vary based on predetermined thresholds and associated GIS data. In general, probable location region 350 represents the area within terminal 300 in which the owner of the device is likely to be located currently.

In various embodiments, probable location region 350 is the region in which devices are targeted by lost device notification program 130 to receive notifications about the lost device. In general, the advantage of only targeting the devices included within probable location region 350 is that less of a disturbance is created when only a subset of the devices included within terminal 300 are targeted to receive notifications.

In some embodiments, devices are targeted to receive a lost device notification if they are within or near probable location region 350. For example, in one embodiment, a device is targeted to receive a lost device notification if the device is either inside of or within 15 feet of probable location region 350.

In the embodiment depicted in FIG. 3, lost device notification program 130 may send notifications to each display device located either within probable location region 350 or within 20 feet of probable location region 350. In this embodiment, display devices may include television screens, displays which are used to display current flight information to airline passengers, terminals used by airline employees, and public address (PA) systems. Additionally, notifications may proactively be issued to display devices located at the destination of the owner of the device (e.g., gate 320), such that one or more people can inform the owner of the device upon their arrival at their destination that they have lost their device (e.g., mobile computing device 150). In some embodiments, each of these devices is registered with lost device notification program 130 and a location of each device is stored, along with identification information for the device, to device register 120. For immobile devices (e.g., television monitors, desktop computers, etc.), a location may be assigned to the device, and the device may not provide lost device notification program 130 with location information.

Figure 4:
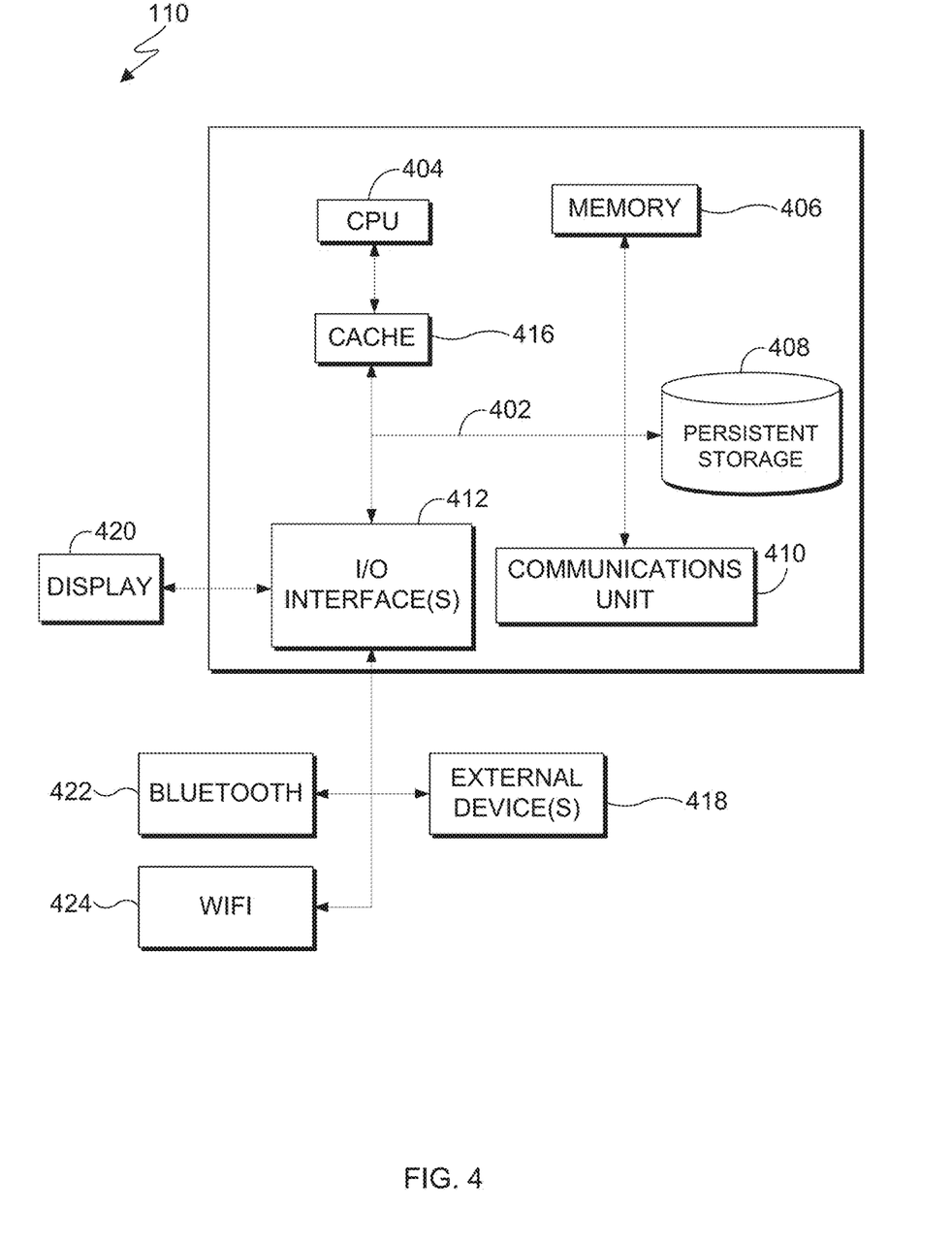
FIG. 4 is a block diagram illustrating the hardware components included in the computing device of FIG. 1 executing the lost device notification program, in accordance with an embodiment of the invention.

FIG. 4 depicts the components of computing device 110, which is an example of a computing device that includes lost device notification program 130 of embodiments of the present invention. FIG. 4 may also depict components of mobile computing device 150 and wireless device 160. Computing device 110 includes communications fabric 402, which provides communications between CPU 404, memory 406, persistent storage 408, communications unit 410, input/output (I/O) interface(s) 412, cache 416. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data and data near accessed data from memory 406.

Program instructions and data used to practice embodiments of the present invention may be stored in persistent storage 408 for execution by one or more of the respective CPU(s) 404 via cache 416 and one or more memories of memory 406. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Bluetooth® device 422 and Wi-Fi® device 424 are devices which facilitate transferring digital information wirelessly between mobile computing device 150 and other computing devices using Bluetooth® or Wi-Fi® technology respectively. In some embodiments, the use of APIs may be required for software executed by mobile computing device 150 to transfer data via Bluetooth® device 422 or Wi-Fi® device 424. Other devices may be used that are capable of facilitating the transfer of digital information between mobile computing device 150, wireless device 160, and/or computing device 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for notifying a user of a location of a device, the method comprising:
   receiving a first location of a first device;
   determining, by one or more processors, that the first device has been separated from a user of the first device;
   determining a second device located at, within a first predetermined threshold, the first location;
   sending a first notification to the second device, wherein the notification includes, at least, that the first device is located nearby
   retrieving registration information of the user, wherein the registration information includes, at least, historical usage information of a plurality of devices associated with the registration information;
   determining a third device located with the user, based on the historical usage information; and
   sending a second notification to the third device, wherein the second notification information includes, at least, information indicating the location of the first device.

2. The method of claim 1, further comprising:
   analyzing data associated with the user of the first device, wherein the data includes a destination of the user;
   determining a projected location of the user of the first device based on, at least, the data;
   determining a fourth device located at, within a second predetermined threshold, the projected location; and sending a third second notification to the fourth device, wherein the third notification includes, at least, additional information indicating the location of the first device.

3. The method of claim 1, wherein determining that the first device has been separated from the user of the first device comprises:
   receiving an indication that a wireless communication link between the first device and a fourth device has been severed; and
   determining that the first device has been separated from the user of the first device based on, at least, the received indication.

4. The method of claim 2, wherein determining the projected location of the user of the first device is further based on the first location of the first device, an amount of time that has elapsed since determining that the first device has been separated from a user of the first device, and an estimated travel speed of the user.

5. The method of claim 1, wherein the first device and the second device are each registered devices, wherein a registered device includes identification information for the registered device and periodically updates a location of the registered device.

6. A computer program product for notifying a user of a location of a device, the computer program product comprising:
   one or more computer readable hardware storage media and program instructions stored on the one or more computer readable hardware storage media, the program instructions comprising:
   program instructions to receive a first location of a first device;
   program instructions to determine that the first device has been separated from a user of the first device;
   program instructions to determine a second device located at, within a first predetermined threshold, the first location;
   program instructions to send a first notification to the second device, wherein the notification includes, at least, that the first device is located nearby
   program instructions to retrieve registration information of the user, wherein the registration information includes, at least, historical usage information of a plurality of devices associated with the registration information;
   program instructions to determine a third device located with the user, based on the historical usage information; and
   program instructions to send a second notification to the third device, wherein the second notification information includes, at least, information indicating the location of the first device.

7. The computer program product of claim 6, further comprising:
   program instructions, stored on the one or more computer readable hardware storage media, to analyze data associated with the user of the first device, wherein the data includes a destination of the user;
   program instructions, stored on the one or more computer readable hardware storage media, to determine a projected location of the user of the first device based on, at least, the data;
   program instructions, stored on the one or more computer readable hardware storage media, to determine a fourth device located at, within a second predetermined threshold, the projected location; and
   program instructions, stored on the one or more computer readable hardware storage media, to send a third notification to the fourth device, wherein the third notification includes, at least, additional information indicating the location of the first device.

8. The computer program product of claim 6, wherein program instructions to determine that the first device has been separated from the user of the first device comprise:
   program instructions to receive an indication that a wireless communication link between the first device and a fourth device has been severed; and
   program instructions to determine that the first device has been separated from the user of the first device based on, at least, the received indication.

9. The computer program product of claim 7, wherein program instructions to determine the projected location of the user of the first device is further based on the first location of the first device, an amount of time that has elapsed since determining that the first device has been separated from a user of the first device, and an estimated travel speed of the user.

10. The computer program product of claim 6, wherein the first device and the second device are each registered devices, wherein a registered device includes identification information for the registered device and periodically updates a location of the registered device.

11. A computer system for notifying a user of a location of a device, the computer system comprising:
    one or more computer processors, one or more computer readable storage media, and program instructions stored on the computer readable storage media for execution by at least one of the one or more processors, the program instructions comprising:
    program instructions to receive a first location of a first device;
    program instructions to determine that the first device has been separated from a user of the first device;
    program instructions to determine a second device located at, within a first predetermined threshold, the first location;
    program instructions to send a first notification to the second device, wherein the notification includes, at least, that the first device is located nearby
    program instructions to retrieve registration information of the user, wherein the registration information includes, at least, historical usage information of a plurality of devices associated with the registration information;
    program instructions to determine a third device located with the user, based on the historical usage information; and
    program instructions to send a second notification to the third device, wherein the second notification information includes, at least, information indicating the location of the first device.

12. The computer system of claim 11, further comprising:
    program instructions, stored on the computer readable storage media for execution by at least one of the one or more processors, to analyze data associated with the user of the first device, wherein the data includes a destination of the user;
    program instructions, stored on the computer readable storage media for execution by at least one of the one or more processors, to determine a projected location of the user of the first device based on, at least, the data;
    program instructions, stored on the computer readable storage media for execution by at least one of the one or more processors, to determine a fourth device located at, within a second predetermined threshold, the projected location; and program instructions, stored on the computer readable storage media for execution by at least one of the one or more processors, to send a third notification to the fourth device, wherein the third notification includes, at least, additional information indicating the location of the first device.

13. The computer system of claim 11, wherein program instructions to determine that the first device has been separated from the user of the first device comprise:

program instructions to receive an indication that a wireless communication link between the first device and a fourth device has been severed; and program instructions to determine that the first device has been separated from the user of the first device based on, at least, the received indication.

14. The computer system of claim 12, wherein program instructions to determine the projected location of the user of the first device is further based on the first location of the first device, an amount of time that has elapsed since determining that the first device has been separated from a user of the first device, and an estimated travel speed of the user.

15. The computer system of claim 11, wherein the first device and the second device are each registered devices, wherein a registered device includes identification information for the registered device and periodically updates a location of the registered device.

* * * * *